(12) United States Patent
Dietzel et al.

(10) Patent No.: US 6,324,045 B1
(45) Date of Patent: Nov. 27, 2001

(54) DIGITAL TWO-STEP CONTROLLER FOR AN ACTUATOR ELEMENT

(75) Inventors: Bernd Dietzel, Syrgenstein; Manfred Bek, Heidenheim, both of (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 09/176,290

(22) PCT Filed: Apr. 17, 1997

(86) PCT No.: PCT/EP97/01935

§ 371 Date: Dec. 31, 1998

§ 102(e) Date: Dec. 31, 1998

(87) PCT Pub. No.: WO97/40427

PCT Pub. Date: Oct. 30, 1997

(30) Foreign Application Priority Data

Apr. 19, 1996 (DE) .............................. 196 15 519

(51) Int. Cl.⁷ .................................................. H01H 47/00
(52) U.S. Cl. ........................... 361/152; 361/154; 361/160
(58) Field of Search ................................. 361/139, 152, 361/154, 160; 701/51, 66

(56) References Cited

U.S. PATENT DOCUMENTS

| | | | |
|---|---|---|---|
| 4,665,348 | * 5/1987 | Stupak, Jr. | 318/135 |
| 4,770,178 | * 9/1988 | Sausner et al. | 123/490 |
| 4,855,913 | 8/1989 | Brekkestran et al. | 364/424.1 |
| 5,251,091 | 10/1993 | Ito et al. | 361/152 |
| 5,461,563 | 10/1995 | Mimura et al. | 364/424.1 |
| 5,933,313 | * 8/1999 | Furukawa | 361/154 |

FOREIGN PATENT DOCUMENTS 32 25 254 A1 1/1984 (DE) .
40 12 577 C1 4/1991 (DE) .

OTHER PUBLICATIONS

Ref.. Dubbel, reference book for mechanical engineering, Springer Verlag, Berlin, Heidelberg, New York, 1955, pp. X8 through X9. (No Month).
English abstract of Japanese patent document No. 07091530, Apr. 4, 1995.
"Hydrodynamik in der Antriebstechnik" published by J.M. Voith GmbH, Vereinte Fachverlage Krauskopf–Ingenieur Digest, Mainz, 1987. (No Month).

* cited by examiner

*Primary Examiner*—Michael J. Sherry
(74) *Attorney, Agent, or Firm*—Taylor & Aust, P.C.

(57) ABSTRACT

A digital two-step controller for an actuator element includes an A/D converter, an output driver and a control device with a memory. An analog measuring signal is received from the actuator, converted in the A/D converter into an actual digital value, and is input into a first region of the memory of the control device. The actual digital value which is input into the first region of the memory is compared with a theoretical digital value for the actuator, which value is stored in a second region. The output of the control device to the output driver is set to ZERO when the actual digital value is larger or equal to the theoretical digital value. The output of the control device to the output driver is set to ONE when the theoretical digital value is greater than the actual digital value. After a sampling period Δt, another analog measuring signal is received from the actuator and the regulation steps are repeated in an interrupt called in cycles and corresponding to the sampling interval.

16 Claims, 4 Drawing Sheets

DIGITAL TWO-STEP CONTROLLER FOR AN ACTUATOR ELEMENT

BACKGROUND OF THE INVENTION

1. Field of the Invention

The present invention relates to control transmissions with hydraulic and mechanical gearing, especially transmissions which are used in commercial utility vehicles.

2. Description of the Related Art

All gear shofts should be smooth under load, regardless of the type of engine or differential transmissions that are being applied. These requirement for a transmission control unit are best addressed with an electrohydraulic conyrol system, whose operating principle, for example, is described in the technical publication "Hydrodynamik in der Antriebstechnik", published by J. M. Voith GmbH, Vereinte Fachverlage Krauskopf-Ingenieur Digest, Mainz, 1987.

The electronics and hydraulics of the above-mentioned electrohydraulic control systems are joined together via solenoid valves including a magnetizing coil, a piston valve and a pull-back spring. Until now, the control of the solenoid valves has been accomplished by continuous controllers which were either hardware-based or software-based. A significant simplification in the control of automatic transmissions, as compared to the continuous controllers, was achieved by the application of two-step controllers (ref. Dubbel, reference book for mechanical engineering, Springer Verlag, Berlin, Heidelberg, N.Y., 1995, Pages X8 through X9). According to the state of the art, these controllers were built using hardware circuitry whereby, the comparators, for example, were applied in the form of connected operational amplifiers. The hardware-based circuitry was designed as application-specific integrated circuitry (ASIC). The setting of the hysteresis, which is required for the stable operation of a two-step controller (ref. Dubbel, rest as stated above, page X8), was accomplished by applying resistors into the circuit design. In a very time-consuming balancing process, these resistors had to be adjusted for every transmission control system as part of a post-manufacturing process. This required among other things, for example, the checking of the entire control system and a manual soldering of balance resistors into the circuitry.

Further, the hardware circuitry assigns a discrete manipulated output for every actual input value. This rigid relationship did not permit the control of two solenoid valves with one and the same controller.

SUMMARY OF THE INVENTION

The present invention provides a digital two-step controller and a digital two-step control process, which surmounts the above-mentioned disadvantages associated with the state of the art. The application of the two-step controller avoids the manual balancing process, which has thus far been a necessity. Furthermore, the present invention provides the capability of controlling several valves with one and the same arrangement.

In accordance with the present invention, the chosen gear befits the vehicle speed and engine load so that optimum engine operating conditions and driveability characteristics can be achieved all times, even under varying driving conditions. The digital two-step controller is designed by comparing the digital actual value stored in memory to a set point value, which is also stored in memory. This comparative assessment is the starting point for the subsequent steps.

In one embodiment, the digital actual value is subtracted from the digital set point value and, depending on the algebraic sign of this difference, the process progresses to the next steps. In another embodiment, a digital hysteresis value, which is characteristic for this controller, is added to the set point value, which forms the basis for the hysteresis adjustment of the two-step controller.

It is seen as an advantage for the sampling time to be in the area of 0.1 to 10 milliseconds. It is especially advantageous to work with a sampling period of one millisecond. A sampling period of one millisecond makes it possible for the digital two-step controller to control the actuator sufficiently fast. At very low measured signal strengths, an amplifying circuit can be used to process this analog signal. In another embodiment, the actuator is replaced by a magnetizing coil of a solenoid valve, which is controlled by the digital two-step controller as described in this invention. Thus, the two-step controller, as an embodiment of this invention, can be applied to control an electrohydraulic transmission unit through the use of solenoid valves. This transmission unit is preferably a torque divider transmission.

In addition to the above-mentioned digital two-step control devices, this invention also provides several processes for the two-step control of an actuator element.

The first invention-related process deals with a two-step control logic in which a digital actual value is compared to a digital set point value. In a second design variation, a difference between the digital actual value and the set point value is determined, and the control is performed with the use of this differential signal. In a third design variation, a possible hysteresis of the two-step controller is considered.

The invention is described in more detail below by use of design examples and graphical representations.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 4:
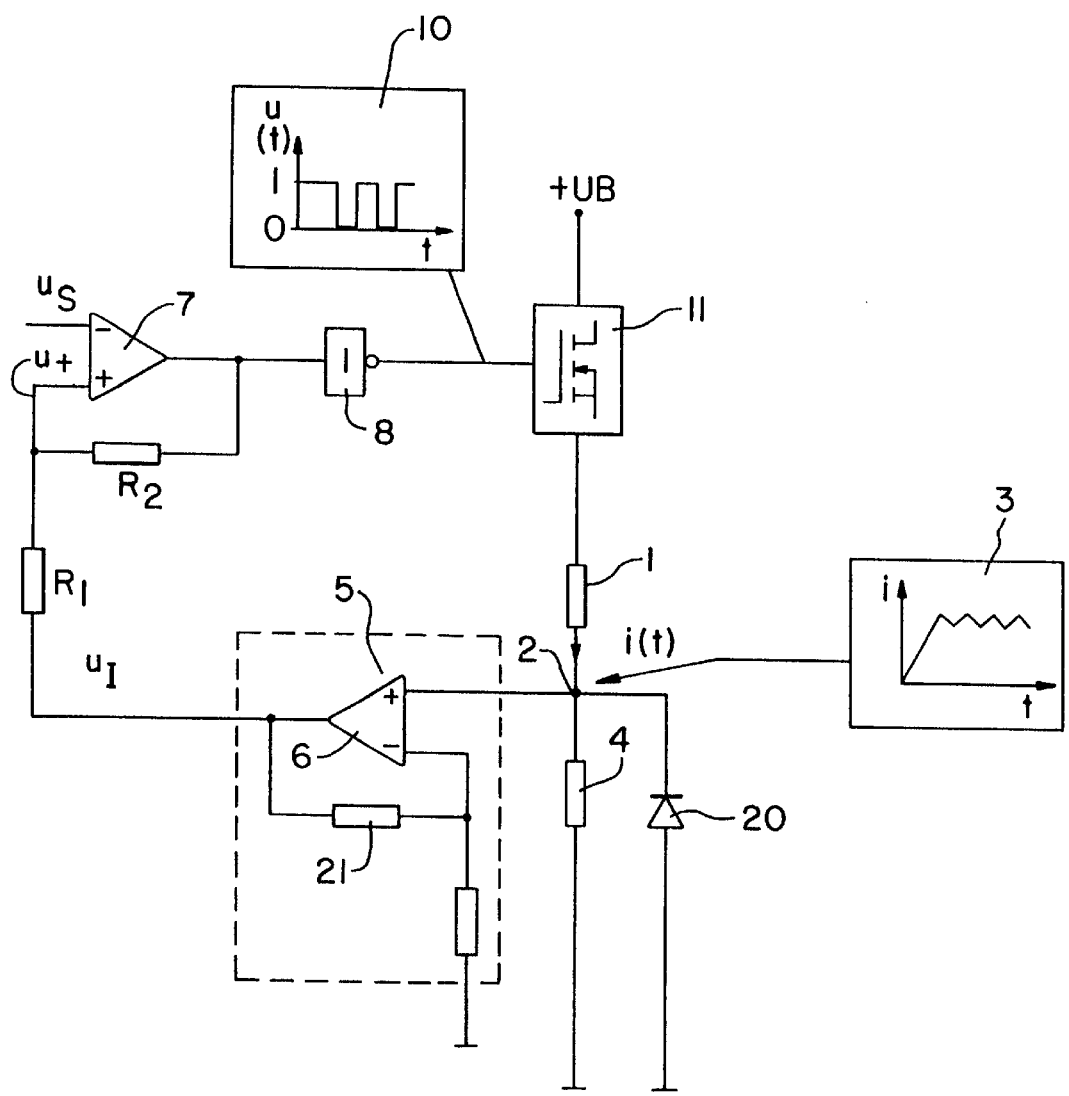
FIG. 4 is a circuitry of a two-step controller according to the state of the art.

FIG. 4 depicts the circuitry of a two-step controller for the magnetizing coil 1 of a solenoid valve (not shown). The progression of a measured signal i(t) at point 2 is shown in plot 3. Per this example, the measured signal is received by magnetizing coil 1 in form of current i(t). The voltage of the measured signal i(t) drops off across measuring resistor 4 and is subsequently amplified, by an amplifying circuit 5 including an operational amplifier 6, to voltage $U_i$. $U_i$ should be between 0 and 5 Volts. According to the circuitry shown, the positive input to a comparator 7 has a positive voltage U+ which corresponds to the actaul value $U_i$ minus the voltage drop across the resistor R1. The resistor R1, which is ahead of the positive input of operational amplifier 7, determines the hysterisis of the depicted controller. Thus, resistor R1 functions just like resistior R2, which is connected betwen the positive input and the output of the operational amplifier. In the compactor 7, which is connected as an operational amplifier, the voltage value U+ is compared against the set voltage value $U_s$, which also should lie between 0 and 5 Volts. The comparative assessment of these analog signals yields a binary signal representing a logical 1 (one) and 0 (zero). The binary signal is supplied to invertor 8 so that an inverted voltage signal is present at the output of the invertor, as shown in plot 10. The output signal U(t) of the invertor 8 drives output driver 11, which is supplied with a voltage $+U_b$. The output driver 11 drives the to-be-controlled magnetizing coil 1. According to the state of the art, the hysteresis value of the controller has to be adjusted by the R1 and R2 resistors. Additionally, a tuning of the entire control circuitry to the respective transmission utilizing the solenoid valve is required.

Figure 1:
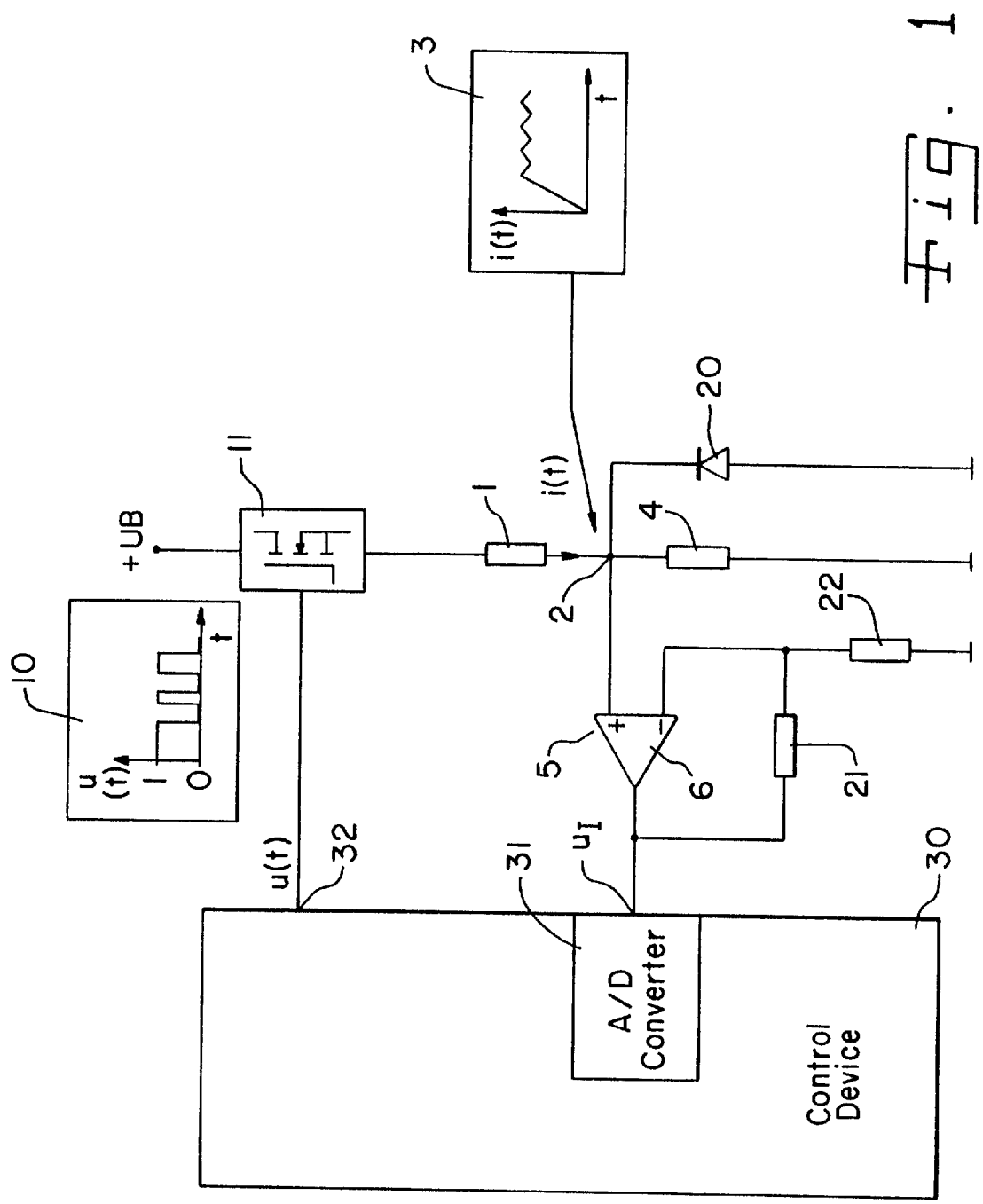
FIG. 1 is a digital two-step controller for a solenoid valve in accordance with the intent of this invention.
Figure 2:
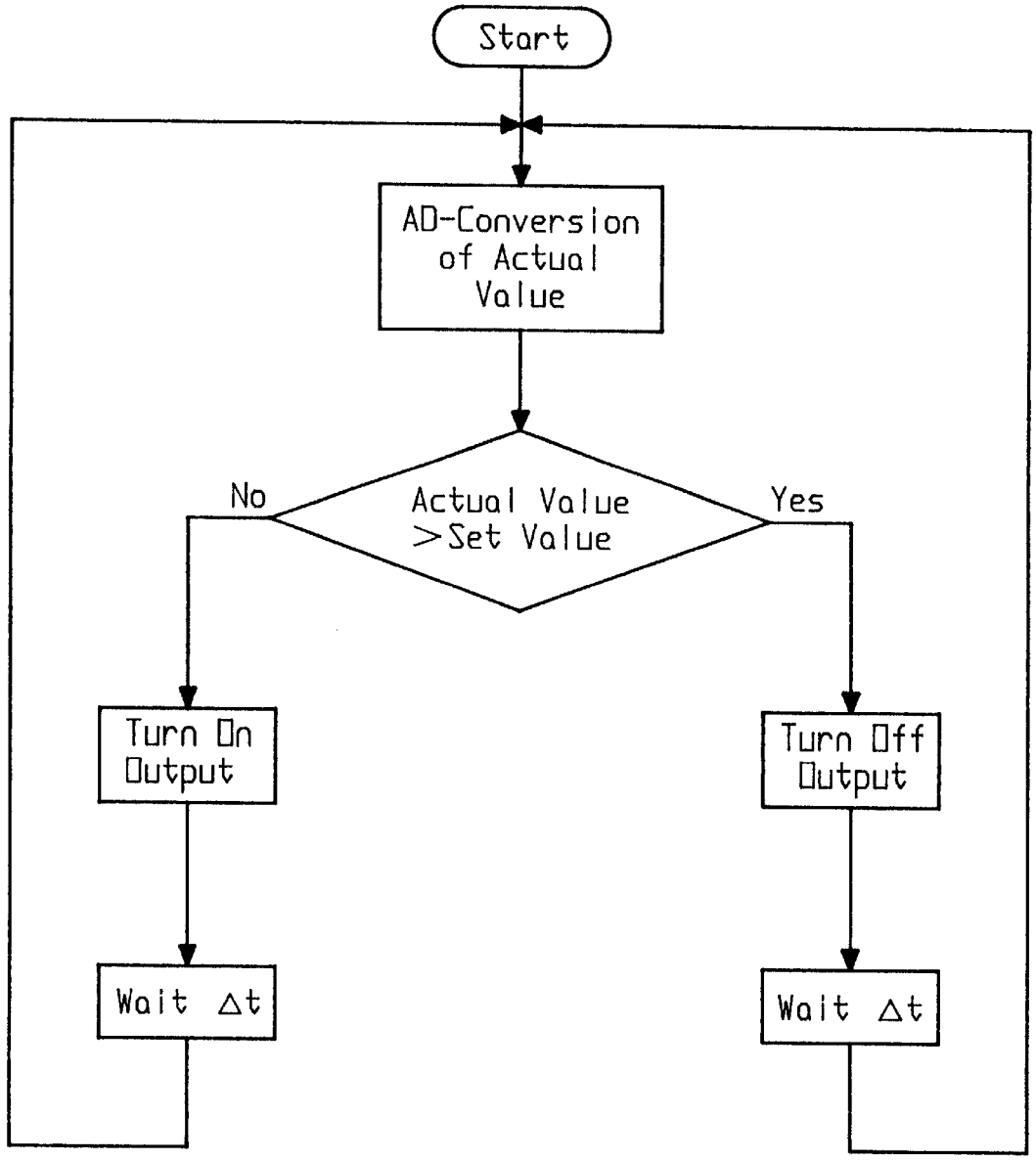
FIG. 2 is a flow chart of a digital two-step controller in accordance with the intent of this invention using the comparative assessment method as an operating principle.

FIG. 1 illustrates the circuitry of the digital two-step controller as described by this invention. Just like the state-of-the-art two-step controller, the control arrangement (shown in FIG. 1), which is the subject of this invention, controls the magnetizing coil of a solenoid valve. It is certainly possible to control other actuating elements besides a magnetizing coil having a set point value with the circuitry depicted in FIG. 1. The measured signal of the magnetizing coil includes the electrical current i(t) at point 2 of the circuit, which is converted into a voltage value by measuring resistor 4. Diode 20 is connected in parallel to measuring resistor 4. The measured signal is amplified by amplifying circuit 5, which includes at least one operational amplifier 6 and resistors 21, 22. The amplified signal is supplied as analog actual value $U_I$ to control device 30, which, in this case, is a microprocessor. The analog voltage signal is then converted by A/D converter 31 from an analog signal to a digital signal and is stored in a digital storage area of control device 30. The digital actual value is, according to the flowchart depicted in FIG. 2, compared to the set point value stored in the second area of the storage device. If the actual value is greater than or the same as the set point value stored in memory, output 32 of the control device 30 is turned off, i.e., it is set to a logical ZERO. If, on the other hand, the actual value is less than the set point value, then output 32 is turned on, i.e., it is set to a logical ONE. The input of a new actual value via the A/D converter 31, which always has an analog signal attached, is performed after sampling period (Δt), and the previously performed comparative assessment between the actual value and the set point value is renewed. In summary, the resultant voltage progression of output 32 is depicted in plot 10. The sampling interval, in accordance to the individual application of the controller, can vary from 0.1 to 10 milliseconds. Experience has shown a sampling time of one millisecond to be especially suitable for fast and satisfactory control characteristics. It has proven to be very beneficial to input the actual values into the A/D converter 31 for conversion from an analog into a digital value with the aid of a cyclically-commanded interrupt.

The output signal U(t), according to the embodiment shown in FIG. 4, drives output driver 11 which is connected to magnetizing coil 1.

It is, of course, possible to realize other control concepts in microprocessor 30. For example, it is possible to calculate the difference between the corrected digital actual value and the set point value, instead of performing a direct comparative assessment between them. The difference is subsequently used for the activation or de-activation of output 32, depending upon whether the difference is greater or less than zero. By designing the two-step controller in digital form, it is easily possible to scale or normalize the controller. This is not done by scaling the rapidly changing actual value of the parameter to be controlled, which is usually the magnetic force, but by scaling the set point value, which changes at a substantially slower rate. In the present case, the set point value changes every 10 milliseconds at a maximum.

Figure 3:
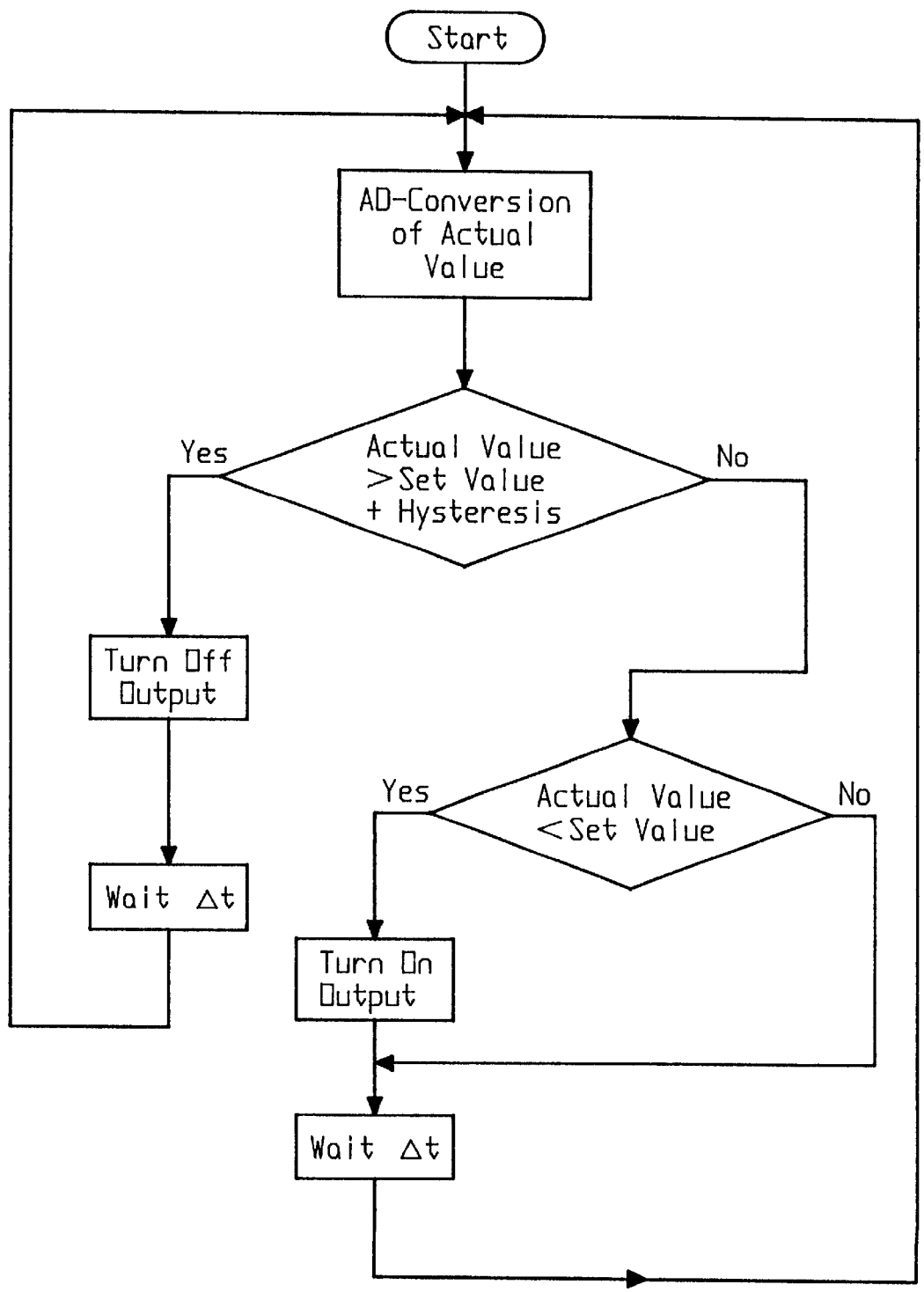
FIG. 3 is a flow chart for the control program of a solenoid valve with a hysteresis influence.

In a further embodiment of this invention, it is also possible, as shown in the graphical representation of FIG. 3, to variably adjust the hysteresis which is required for the stable operation of a two-step controller. In contrast to the fixed wiring as depicted in FIG. 4, this is not accomplished by soldering fixed resistors into the circuitry, but by storing a hysteresis value in the third area of the control device 30. The operation and control of output 32 of the control device 30 occurs as follows: If the digital actual value (formerly analog value $U_i$ prior to the conversion) is greater than or equal to the sum of a set point value stored in a second area of the control device 30 and a hysteresis value stored in a third area of the control device 30, output 32 is turned off, i.e., it is set to a logical ZERO. If this is not the case, a subsequent interrogation is performed to determine if the digital actual value is less than the digital set point value. If this is the case, output 32 is turned on, i.e., a logical ONE is issued. If the digital actual value is greater, or the same as the digital set point value, then the output is left in the same position as it was prior to the entry of the actual value into the computer. After sampling period At, a new value is fed to the control device 30 and the previously indicated interrogations are once again initiated. Corresponding to the results, the output is either turned off, turned on, or left in the same position as it was prior to the entry of the value.

With the present invention, it is possible for the first time to control an actuator digitally, which is preferably a solenoid valve for a transmission control unit. It bears the advantage that a substantially simpler circuitry can be realized, as well as a simpler method of adapting the controller to various operating conditions.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A digital two-step controller, comprising:
   an actuator;
   an output driver electrically connected to said actuator, said output driver being configured for transmitting a series of analog measured signals to said actuator, with the analog measured signals being separated by a substantially constant sampling period; and
   a control device including an analog/digital converter and a memory device having a first area, said control device having an output electrically connected with said output driver, said analog/digital converter being configured for receiving each said analog measured signal from said actuator, converting each said analog measured signal into a digital actual value, and storing each said digital actual value in said first area of said memory device, said control device being configured for comparing each said digital actual value stored in said first area of said memory device to a digital set point value for said actuator stored in a second area of said memory device, said output of said control device being configured for being set to logical ZERO if a current said digital actual value is one of greater than and equal to the digital set point value, said output of said control device being configured for being set to logical ONE if a current said digital actual value is less than the digital set point value.

2. A digital two-step controller, comprising:

an actuator;

an output driver electrically connected to said actuator, said output driver being configured for transmitting a series of analog measured signals to said actuator, with the analog measured signals being separated by a substantially constant sampling period; and a control device including an analog/digital converter and a memory device having a first area, said control device having an output electrically connected with said output driver, said analog/digital converter being configured for receiving each said analog measured signal from said actuator, converting each said analog measured signal into a digital actual value, and storing each said digital actual value in said first area of said memory device, said control device being configured for subtracting a digital set point value for said actuator stored in a second area of said memory device from each said digital actual value stored in said first area of said memory device to arrive at a plurality of difference values, said output of said control device being configured for being set to logical ZERO if a current said difference value is one of greater than and equal to zero, said output of said control device being configured for being set to logical ONE if a current said difference value is less than zero.

3. A digital two-step controller, comprising:

an actuator;

an output driver configured for transmitting a series of analog measured signals to said actuator, with the analog measured signals being separated by a substantially constant sampling period; and a control device including an analog/digital converter and a memory device having a first area, said control device having an output electrically connected with said output driver, said analog/digital converter being configured for receiving each said analog measured signal from said actuator, converting each said analog measured signal into a digital actual value, and storing each said digital actual value in said first area of said memory device, said control device being configured for comparing each said digital actual value stored in said first area of said memory device to a digital sum value stored in a second area of said memory device, said digital sum value being equal to a digital set point value for said actuator plus an adjustable digital hysteresis value for said actuator, said output of said control device being configured for being set to logical ZERO if a current said digital actual value is one of greater than and equal to the digital sum value, said control device being configured for comparing each said digital actual value to the digital set point value for said actuator stored in a third area of said memory device if a current said digital actual value is less than the digital sum value, said output of said control device being configured for being set to logical ONE if a current said digital actual value is less than the digital set point value, said output of said control device being configured for not being set if a current said digital actual value is one of greater than and equal to the digital set point value.

4. The digital two-step controller of claim 3, wherein said sampling time is approximately between 0.1 milliseconds and 10 milliseconds.

5. The digital two-step controller of claim 4, wherein said sampling time is approximately 1 millisecond.

6. The digital two-step controller of claim 3, further comprising an amplifying circuit configured for receiving each said analog measured signal from said actuator, amplifying the analog measured signal, and transmitting the amplified analog measured signal to said analog/digital converter of said control device.

7. The digital two-step controller of claim 3, wherein said actuator comprises a magnetizing coil.

8. The digital two-step controller of claim 7, wherein said magnetizing coil is configured for being included in a solenoid valve.

9. The digital two-step controller of claim 3, wherein said digital set point value is scaled.

10. A method of digital two-step control of an actuator, comprising the steps of:

transmitting an analog measured signal to the actuator;

converting said analog measured signal into a digital actual value using an analog/digital converter;

storing said digital actual value in a first area of a memory of a control device;

storing a digital set point value for the actuator in a second area of said memory of said control device;

comparing said digital actual value to said digital set point value;

connecting an output of said control device to an output driver of the actuator;

setting said output of said control device to logical ZERO if said digital actual value is one of greater than and equal to said digital set point value;

setting said output of said control device to logical ONE if said digital actual value is less than said digital set point value; and repeating the above steps in a cyclically commanded interrupt corresponding to a sampling period.

11. A method of digital two-step control of an actuator, comprising the steps of:

transmitting an analog measured signal to the actuator;

converting said analog measured signal into a digital actual value using an analog/digital converter;

storing said digital actual value in a first area of a memory of a control device;

storing a digital set point value for the actuator in a second area of said memory of said control device;

subtracting said digital set point value from said digital actual value to arrive at a difference value;

connecting an output of said control device to an output driver of the actuator;

setting said output of said control device to logical ZERO if said difference value is one of greater than and equal to zero;

setting said output of said control device to logical ONE if said difference value is less than zero; and repeating the above steps in a cyclically commanded interrupt corresponding to a sampling period.

12. A method of digital two-step control of an actuator, comprising the steps of:

transmitting an analog measured signal to the actuator;

converting said analog measured signal into a digital actual value using an analog/digital converter;

storing said digital actual value in a first area of a memory of a control device;

storing a digital set point value for the actuator in a third area of said memory of said control device;

adding said digital set point value to an adjustable digital hysteresis value for the actuator to arrive at a digital sum value;

storing said digital sum value in a second area of said memory of said control device;

connecting an output of said control device to an output driver of the actuator;

setting said output of said control device to logical ZERO if said digital actual value is one of greater than and equal to said digital sum value;

comparing said digital actual value to said digital set point value if said digital actual value is less than said digital sum value;

setting said output of said control device to logical ONE if said digital actual value is less than said digital set point value;

inhibiting setting of said output of said control device if said digital actual value is one of greater than and equal to said digital set point value; and repeating the above steps in a cyclically commanded interrupt corresponding to a sampling period.

13. The method of claim 12, wherein said sampling period is approximately between 0.1 milliseconds and 10 milliseconds.

14. The method of claim 13, wherein said sampling period is approximately 1 millisecond.

15. The method of claim 12, comprising the further step of electrohydraulically controlling a transmission with the actuator.

16. The method of claim 15, wherein said transmission comprises a torque divider transmission.

* * * * *

UNITED STATES PATENT AND TRADEMARK OFFICE
CERTIFICATE OF CORRECTION

PATENT NO. : 6,324,045 B1
DATED : November 27, 2001
INVENTOR(S) : Bernd Dietzel et al.

It is certified that error appears in the above-identified patent and that said Letters Patent is hereby corrected as shown below:

Column 1,
Line 11, delete "shofts" and substitute -- shifts -- therefor; and
Line 13, delete "requirement", and substitute -- requirements -- therefor.

Column 3,
Line 11, delete "compactor", and substitute -- comparator -- therefor.

Column 4,
Line 35, delete "At", and substitute -- $\Delta T$ -- therefor.

Signed and Sealed this

Fourth Day of March, 2003

JAMES E. ROGAN
*Director of the United States Patent and Trademark Office*